United States Patent [19]

Smith et al.

[11] Patent Number: 5,632,951
[45] Date of Patent: May 27, 1997

[54] METHOD OF MAKING A FLEXIBLE PLASTIC TUBE

[75] Inventors: Roger P. Smith, Napoleon; Thomas J. Krall, Toledo, both of Ohio

[73] Assignee: Owens-Illinois Plastic Products Inc., Toledo, Ohio

[21] Appl. No.: 228,048

[22] Filed: Apr. 15, 1994

[51] Int. Cl.⁶ ............... B29C 49/04; B29C 49/06; B29C 49/24
[52] U.S. Cl. ............... 264/509; 264/524; 264/539
[58] Field of Search ............... 264/509, 524, 264/539, 132; 156/447, DIG. 10, DIG. 12, DIG. 13, DIG. 26, DIG. 27; 55/331.5, 284, 490

[56] References Cited

U.S. PATENT DOCUMENTS

| | | | |
|---|---|---|---|
| 1,116,523 | 11/1914 | Westlake | 215/44 |
| 1,172,447 | 2/1916 | Forte | 53/331.5 |
| 1,227,297 | 5/1917 | Neidlinger | 264/132 |
| 2,562,523 | 7/1951 | Brunet . | |
| 2,710,987 | 6/1955 | Sherman . | |
| 2,724,329 | 11/1955 | Lucas | 156/DIG. 10 |
| 2,908,034 | 10/1959 | Hackett . | |
| 2,911,673 | 11/1959 | Soubier . | |
| 3,019,480 | 2/1962 | Cheney | 264/539 |
| 3,032,810 | 5/1962 | Soubier . | |
| 3,115,682 | 12/1963 | Soubier et al. . | |
| 3,144,493 | 8/1964 | Santelli . | |
| 4,098,932 | 7/1978 | Frische . | |
| 4,118,452 | 10/1978 | Myers et al. . | |
| 4,175,993 | 11/1979 | Robertson | 156/567 |
| 4,188,179 | 2/1980 | Linss et al. . | |
| 4,305,902 | 12/1981 | Uhlig . | |
| 4,529,469 | 7/1985 | Jorss | 156/DIG. 27 |
| 4,636,166 | 1/1987 | Franks et al. | 264/509 |
| 4,806,091 | 2/1989 | Linss et al. . | |
| 4,806,092 | 2/1989 | Linss et al. . | |
| 4,806,093 | 2/1989 | Linss et al. . | |
| 4,808,105 | 2/1989 | Linss et al. . | |
| 5,150,782 | 9/1992 | Richter | 198/394 |
| 5,201,984 | 4/1993 | Bedin | 156/DIG. 27 |
| 5,224,585 | 7/1993 | Naka et al. | 156/DIG. 27 |
| 5,398,485 | 3/1995 | Osifchin . | |

FOREIGN PATENT DOCUMENTS

| | | | |
|---|---|---|---|
| 268539 | 5/1988 | European Pat. Off. | 264/523 |
| 0334468 | 9/1989 | European Pat. Off. . | |
| 2167559 | 8/1973 | France . | |
| 2680721 | 3/1993 | France . | |
| 55-118834 | 9/1980 | Japan | 264/536 |
| 2-219752 | 9/1990 | Japan | 53/284 |
| 3115341 | 5/1991 | Japan . | |
| 6211256 | 8/1994 | Japan . | |
| 2023088 | 12/1979 | United Kingdom . | |
| 223700 | 4/1991 | United Kingdom . | |

OTHER PUBLICATIONS

Arthur N. Skeels, Jr., Guide to Plastic Bottle Decoration SPE Journal, vol. 27, May 1971.

Primary Examiner—Catherine Timm

[57] ABSTRACT

A flexible plastic tube and a method of forming a flexible plastic tube includes injection molding a finish having an opening, extruding a tube integrally with the finish by relevant movement of the finish with respect to an extruder, moving the finish axially away from the extruder while continuing continuously extruding the tube, closing a blow mold about the extruded tube, blowing the tube into an integral container body having a closed bottom, opening the molds to provide an integral flexible tube with a finish thereon. Thereafter the method includes decorating the body with indicia, cutting the closed end of the tube leaving an open-ended tube of the end opposite the finish, and applying a closure to the finish. Subsequently, the tube is filled through the open end and the open end is closed. The decorating includes rotating the tube about the longitudinal axis of the tube while engaging the finish and bottom. The step of decorating preferably includes rotating the container relative to a silk screen printing device. The step of injection molding and extrusion molding preferably includes injecting and extruding linear low density polyethylene. A closure is applied before or after cutting the bottom from the container.

15 Claims, 4 Drawing Sheets

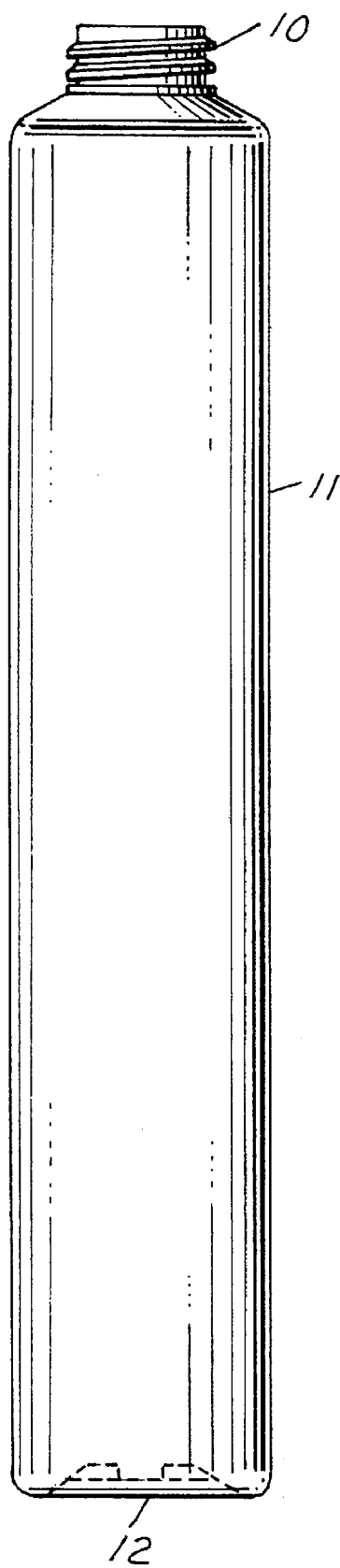
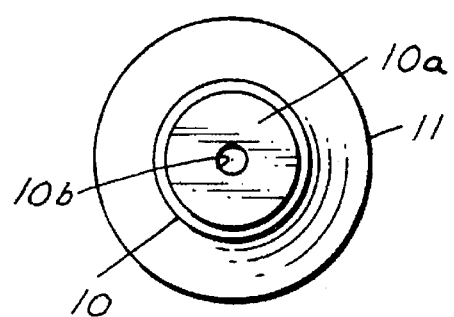
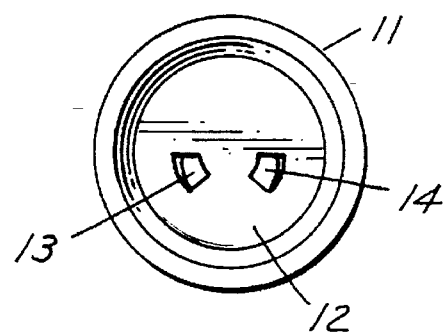
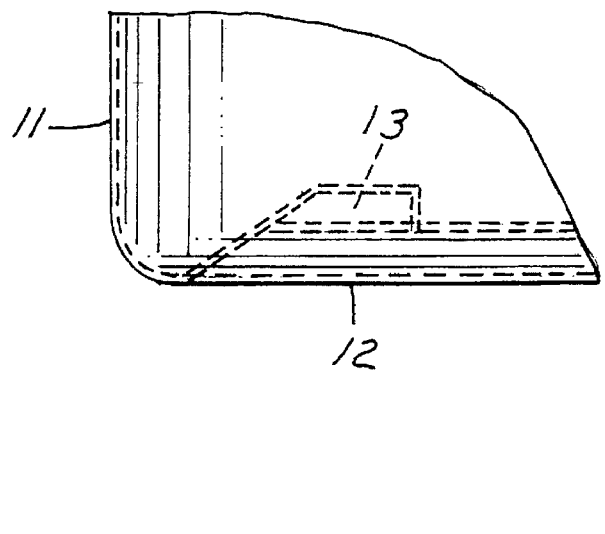

FIG.7
FIG.8
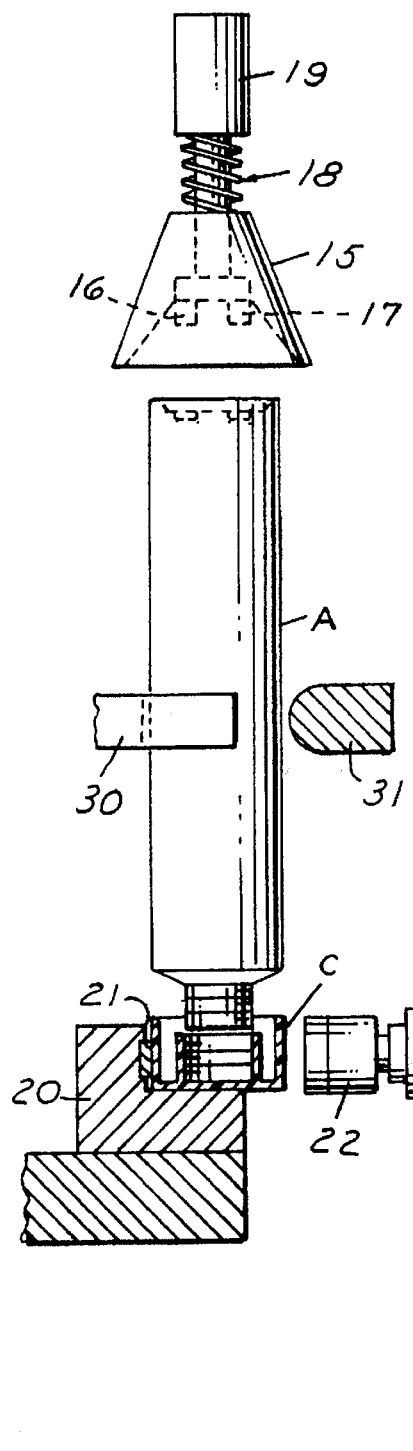
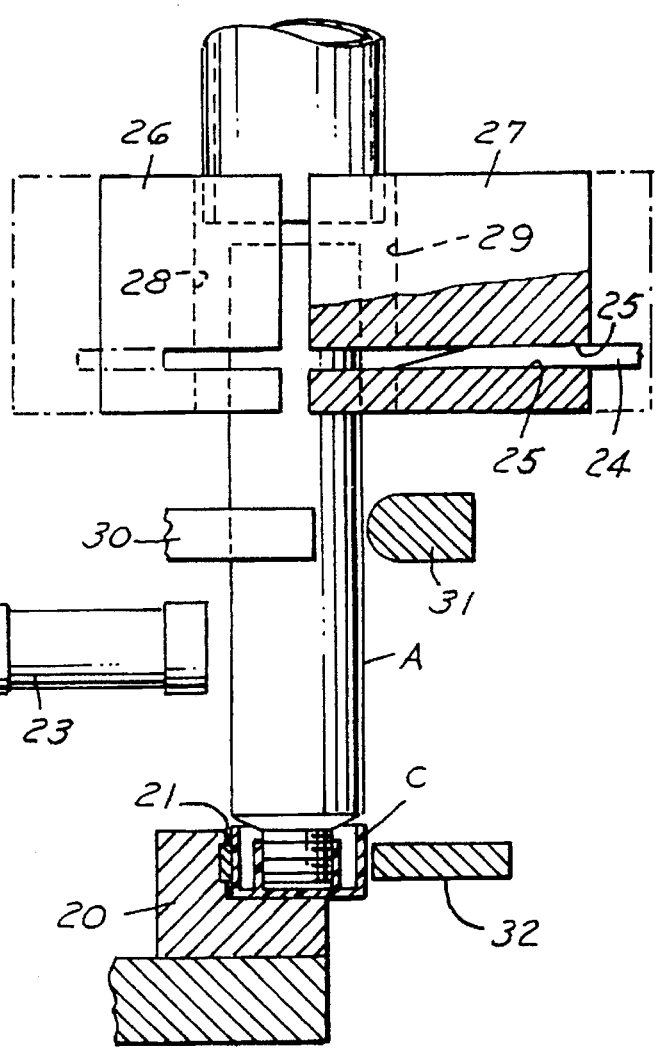

METHOD OF MAKING A FLEXIBLE PLASTIC TUBE

This invention relates to the manufacture of flexible tubes utilized for containing and dispensing viscous products such as personal care products and the like.

BACKGROUND AND SUMMARY OF THE INVENTION

In one method of manufacture of such flexible tubes, a fitment defining a threaded neck is attached to an open-ended tube and then the product is filled through the other end of the tube and the other end is closed.

In another method of making such flexible tubes, a hollow container having an integral neck is formed, as by blow molding, the base of the container is severed from the container, the container is placed on a mandrel whereupon decoration is applied to the open-ended container, a closure is applied to the finish and then the container is filled through the open end and the open end is sealed.

Among the objectives of the present invention are to provide a flexible tube having exceptional decoration or indicia; which incorporates a finish that requires no trimming; and wherein the decoration can be applied by conventional silk screening equipment.

In accordance with the invention, the method of forming a flexible plastic tube comprises injection molding a finish having an opening, extruding a tube integrally with the finish by relevant movement of the finish with respect to an extruder orifice, moving the finish axially away from the extruder orifice while continuing continuously extruding the tube, closing a blow mold about the extruded tube, blowing the tube into an integral container body having a closed bottom, opening the molds to provide an integral flexible tube with a finish thereon. Thereafter the method consists of decorating the body with indicia, and cutting the closed end of the tube leaving an open-ended tube of the end opposite the finish, and applying a closure to the finish. A closure is applied either before or after cutting the bottom from the container. Preferably the closure is applied to the finish after decorating. Subsequently, the tube is filled through the open end and the open end is sealed. The step of decorating includes rotating the tube about the longitudinal axis of the tube while engaging the finish and bottom. The step of decorating preferably comprises rotating the container relative to a silk screen printing device. The step of injection molding and extrusion molding preferably comprises injecting and extruding linear low density polyethylene. However, high density polyethylene and low density polyethylene may be used.

DESCRIPTION OF THE DRAWINGS

FIG. 3 is an elevational view of the container which is used to make the tube.

FIG. 4 is a top plan view.

FIG. 5 is a bottom plan view.

FIG. 6 is a fragmentary view of a portion of the lower end of the container.

FIG. 7 is a fragmentary part sectional view of a preferred method and apparatus for applying the closure.

FIG. 8 is a fragmentary part sectional elevational view of an apparatus for severing the bottom from the container after it is decorated.

DESCRIPTION OF THE PREFERRED EMBODIMENT

Figure 1:
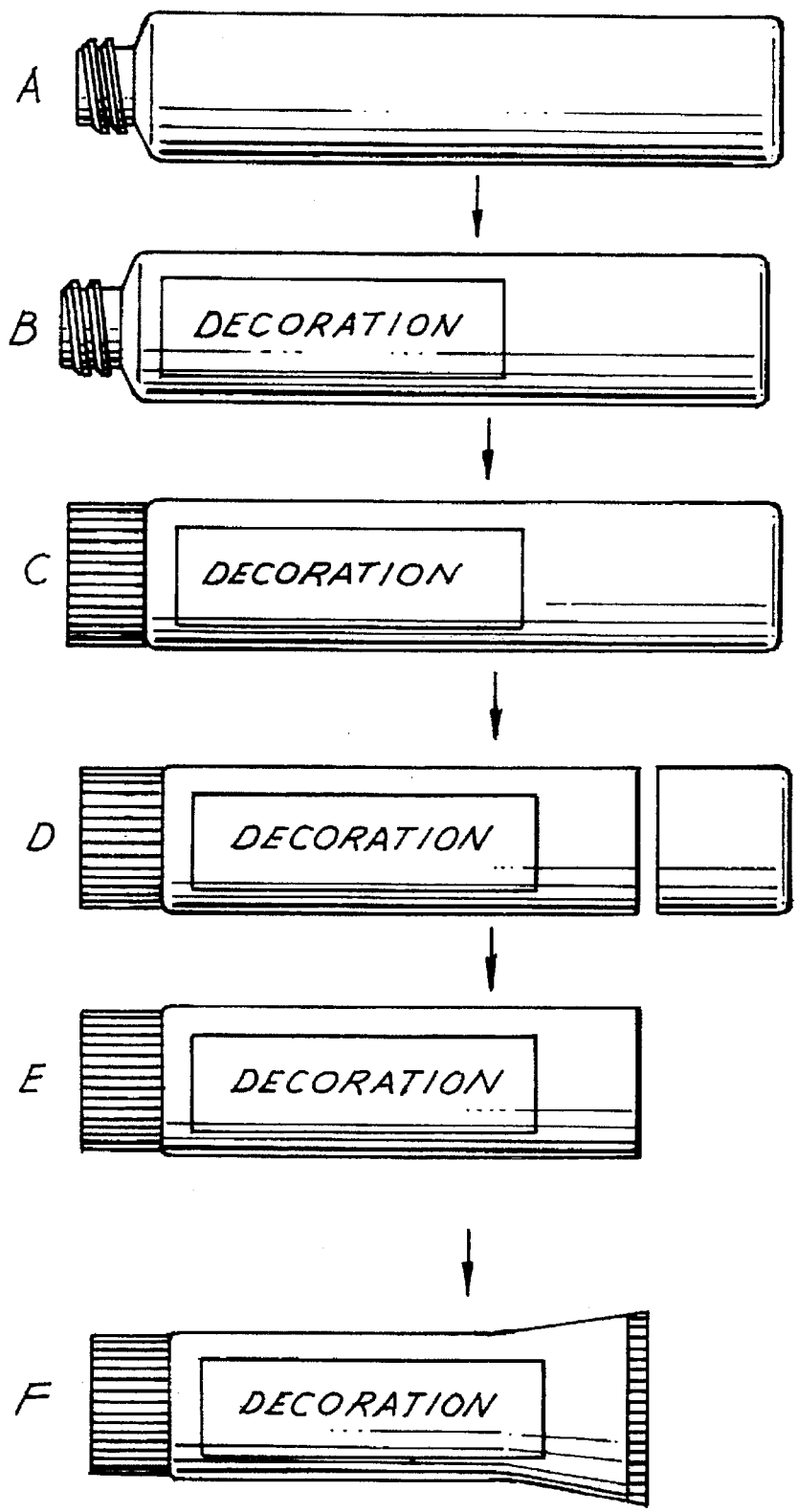
FIG. 1 is a diagram of the steps in making the flexible plastic tube embodying the invention.

Referring to FIG. 1 which is a schematic view of the succession of steps A–F to produce a filled container, the first step A comprises making a hollow plastic container by a method and apparatus wherein the neck or finish of the container is first injection molded, then a tube is extruded integrally with the injection molded finish, molds are closed about the tube and the tube is blown to form a container. Such a method and apparatus is shown in U.S. Pat. Nos. 2,710,987 and 2,911,673, incorporated herein by reference, and embodied in what has become known as a BC-3 machine.

As further shown in FIG. 1, the hollow blown container is then applied with indicia or decoration in one or more colors and designs through step B as may be desired. Step C of FIG. 1 shows applying a closure C to the container. The bottom of the container is then cut off as in step D leaving an open-ended tube as shown in step E. Step E shows the tube with the closure thereon as delivered to a customer. The purchaser of the open-ended tube fills the tube with the viscous product through the open end and then seals the open end as at F.

A closure can be applied either before or after decorating, herein shown as applied after the first decorating step B. Preferably, the closure is applied after decorating.

Figure 2:
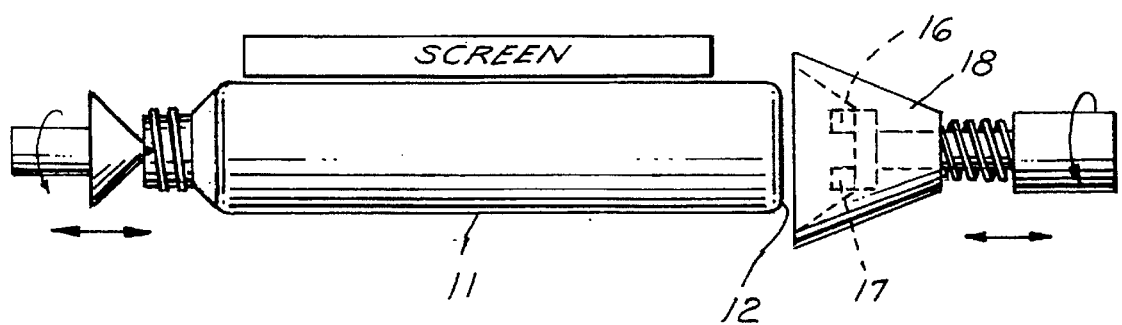
FIG. 2 is a diagram of an apparatus for silk screen decorating of the container.

In accordance with the invention, the decorating steps are performed by rotating the container with respect to silk screen printer stations P, as shown in FIG. 2, by clamping the container and rotating the container relative to the station. Alternatively, decorating can be by in-mold labeling during blow molding of the tube or by heat bonding a label after the container is blown.

Referring to FIGS. 3–6, the container preferably comprises the injection molded finish 10, the extruded side wall or body 11 sufficiently thin thickness that it is flexible, and the integral bottom wall 12 which is thicker and relatively rigid to allow for driving the tube to rotate the tube in the capping and decorating operations. The wall 11 is preferably of substantially constant thickness, for example, ±0.006 in.

As shown in FIGS. 5 and 6, the bottom wall 12 is formed with indentations or recesses 13, 14 which are utilized so that they can be engaged by lugs 16, 17 of a chuck 18 (FIG. 2) for the printing and application of the closure. As shown in FIG. 4, the finish 10 preferably includes a top or transverse wall 10a having a centrally located dispensing opening 10b.

The container is preferably made of linear low density polyethylene. A preferred composition is linear low density polyethylene having a dispersion index of 5. However, high density polyethylene and low density polyethylene may be used.

Referring to FIGS. 7 and 8, a preferred form of apparatus is shown in a copending application filed concurrently herewith, OI Docket No. 16728, Ser. No. 08/228,055 filed Apr. 15, 1994, having a common assignee with the present application, incorporated herein by reference.

Referring to FIG. 8, the apparatus for severing the bottom of a container comprises a lower star wheel 20 having recesses 21 for receiving the closures C on the inverted containers A and an associated guide rail 32. The apparatus also includes an upper star wheel 30 with recesses for the container body 34 and an associated guide rail 31. The upper end of the container is clamped by blocks 26, 27 having recesses 28, 29 which are movable relative to one another to hold the upper end of the container A. A guillotine blade 24 is movable across the bottom of the closure by a cylinder to sever the bottom of the container A along a plane that is at 90° to the vertical or longitudinal axis of the container A. The guillotine 24 is guided by guide surfaces 25 in the blocks 26, 27.

The apparatus of FIG. 7 is preferably positioned at a capping station adjacent a rotary turret 30 which is driven intermittently past the capping station to apply the container to the closure. The apparatus shown in FIG. 8 is located at a trimming station and the turret 30 moves the inverted containers past the trimming station to sever the bottom of the container. A guide rail 32 retains the lower end of the capped container in recesses the lower star wheel during severing of the bottom of the container.

It can thus be seen that there has been provided a method of forming a flexible plastic tube comprises injection molding a finish having an opening, extruding a tube integrally with the finish by relevant movement of the finish with respect to an extruder orifice, moving the finish axially away from the extruder orifice while continuing continuously extruding the tube, closing a blow mold about the extruded tube, blowing the tube into an integral container body having a closed bottom, opening the molds to provide an integral flexible tube with a finish thereon. Thereafter the method consists of decorating the body with indicia, and cutting the closed end of the tube leaving an open-ended tube of the end opposite the finish, and applying a closure to the finish. A closure is applied either before or after cutting the bottom from the container. Preferably the closure is applied to the finish after decorating. Subsequently, the tube is filled through the open end and the open end is sealed. The step of decorating includes rotating the tube about the longitudinal axis of the tube while engaging the finish and bottom. The step of decorating preferably comprises rotating the container relative to a silk screen printing device. The step of injection molding and extrusion molding preferably comprises injecting and extruding linear low density polyethylene. However, high density polyethylene and low density polyethylene may be used.

We claim:

1. The method of forming a flexible plastic tube for use in dispensing a viscous product which comprises, injection molding a neck finish having a shoulder portion and an opening in said neck finish, extruding a tube portion integrally with the neck finish by relative movement of the neck finish with respect to an extruder, moving the neck finish axially away from the extruder while continuing continuously extruding said tube portion, closing a blow mold about the extruded tube, blowing said tube portion into an integral container body having a closed bottom, opening the molds to provide an integral container having an integral neck finish, a shoulder portion, a tubular body portion and a closed bottom, decorating the body portion with indicia, said step of decorating comprising engaging the neck finish and bottom, and then rotating said container about the longitudinal axis of the container while engaging the neck finish and bottom, and thereafter cutting the closed bottom of the container leaving a flexible plastic tube having a finish, a shoulder portion and a flexible tube portion having an open end.

2. The method set forth in claim 1 wherein said step of extruding said tube comprises extruding a tube portion of substantially constant thickness.

3. The method set forth in claim 1 wherein said step of decorating further comprises rotating said container relative to a silk screen printing device.

4. The method set forth in claim 1 wherein said step of decorating comprises applying a label to the container.

5. The method set forth in claim 1 wherein said step of blowing said tube forms indentation means in the bottom of said container and said indentation means is engaged to rotate said container.

6. The method set forth in claim 1 wherein said step of injection molding said neck finish comprises forming said shoulder portion such that it is thicker than said tube portion.

7. The method set forth in claim 6 wherein said steps of extruding and blowing form a bottom that is thicker than said tube portion.

8. The method set forth in claim 1 including applying a closure to the finish of said container prior to cutting the closed bottom of the container.

9. The method set forth in claim 8 wherein said finish has a thread and said closure has a thread including holding said closure and rotating said container to apply said closure.

10. The method set forth in claim 9 wherein said step of blowing said tube forms indentation means in the bottom of said container and said indentation means is engaged to rotate said container.

11. The method set forth in claim 10 wherein said step of cutting is by clamping the container and directing a cutter blade transversely between clamped portions of the flexible tube portion.

12. The method set forth in any one of claims 1, 2, 3, 4–11 wherein said steps of injection molding and extrusion molding further comprises injecting and extruding linear low density polyethylene.

13. The method set forth in claim 12 wherein said linear low density polyethylene having a molecular weight dispersion index greater than 5.

14. The method set forth in any one of claims 1,2,3,4–11 including the step of filling the flexible plastic tube through the open end.

15. The method set forth in claim 14 including the step of thereafter closing said open end of said tube by a transverse seal.

* * * * *